Figure 1:
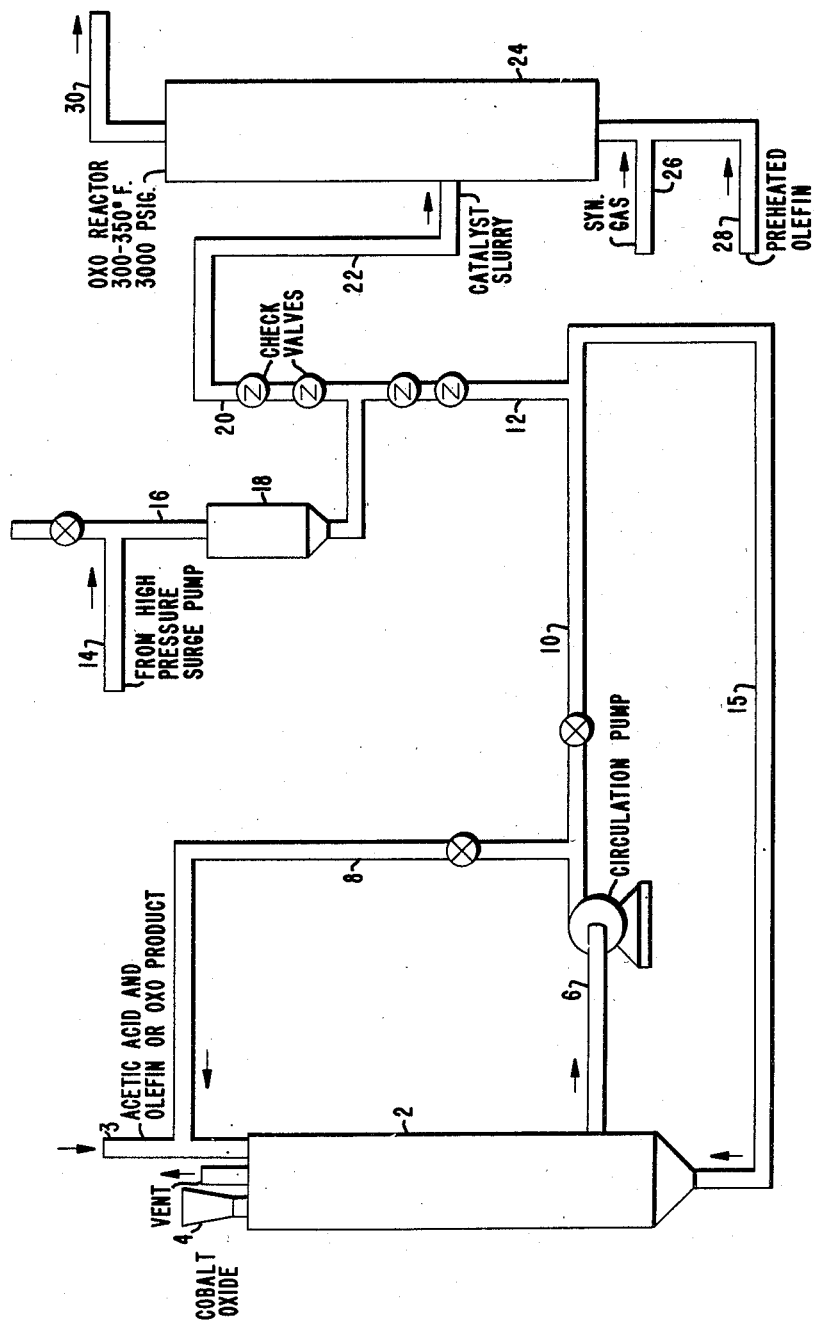

Nov. 5, 1957

C. L. ALDRIDGE ET AL 2,812,356

ORGANIC ACID-PROMOTED COBALT OXIDE OXO CATALYST SYSTEM

Filed Feb. 23, 1955

3 Sheets-Sheet 1

CLYDE L. ALDRIDGE
EGI V. FASCE
INVENTORS

BY Richard W. Nagel ATTORNEY

EFFECT OF ACID ADDITION TO COBALT OXIDE CATALYST

Nov. 5, 1957   C. L. ALDRIDGE ET AL   2,812,356
ORGANIC ACID-PROMOTED COBALT OXIDE OXO CATALYST SYSTEM
Filed Feb. 23, 1955   3 Sheets-Sheet 3

OXONATION OF $C_7$ OLEFINS
EFFECT OF ADDITION OF ACETIC ACID TO COBALT CATALYSTS

CLYDE L. ALDRIDGE
EGI V. FASCE   INVENTORS

BY *Richard H. Nagel*   ATTORNEY

United States Patent Office

2,812,356
Patented Nov. 5, 1957

2,812,356

ORGANIC ACID-PROMOTED COBALT OXIDE OXO CATALYST SYSTEM

Clyde Lee Aldridge, Baker, and Egi Victor Fasce, Baton Rouge, La., assignors to Esso Research and Engineering Company, a corporation of Delaware Application February 23, 1955, Serial No. 489,919

11 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, the present invention relates to catalyst combinations particularly adapted to catalyze this reaction.

It is now well known in the art that oxygenated organic compounds may be synthesized from organic compounds containing olefinic linkages by a reaction with carbon monoxide and hydrogen in the presence of a catalyst containing metals of the iron group, particularly cobalt, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

The carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch chained olefins and diolefins, such as propylene, butylene, pentene, hexene, heptene, butadiene, pentadiene, styrene, olefin polymers, such as di- and tri-isobutylene and hexene and heptene dimers, polypropylene, olefinic fractions from the hydrocarbon synthesis process, thermal or catalytic cracking operations, an other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g., and at temperatures in the range of about 150°–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and unreacted material are generally withdrawn to a catalyst removal zone where dissolved catalyst is removed from the mixture by thermal treatment in the presence of an inert gas, a vapor, hot water, or dilute acid. Thereafter, the aldehydic reaction produce is generally hydrogenated to the corresponding alcohol.

It has been recognized that substantially all forms of cobalt catalyze this reaction, for the active catalytic agent is cobalt hydrocarbonyl in all probability; this compound is synthesized in situ from the cobalt compound or metal originally introduced. However, it has been preferred to employ the compounds of cobalt that are oil-soluble, such as high molecular weight salts of cobalt, i. e. cobalt oleate or naphthenate. These materials form a homogeneous reaction mixture and have a high reactivity or reaction rate, substantially higher than cobalt metal or oxide, or aqueous solutions of cobalt salts, such as cobalt formate or acetate. However, the use of high molecular weight cobalt carboxylates has certain disadventages. They are expensive to prepare, requiring a variety of processing steps, and also contaminate the final reaction product with the acid or ester corresponding to the carboxylate employed. Furthermore, though the reactivity and reaction rates are high, leading to high olefin conversions, the aldehyde and alcohol selectivity resulting from use of these catalysts is not always satisfactory, and may be somewhat low.

An alternative system is the use of metallic cobalt or slurry of cobalt oxide. These catalytic agents, though they have no residues to contaminate the aldehyde or alcohol product, and though they give a better alcohol selectivity than the oil-soluble cobalt soap, have a very slow reaction rate. This is a very serious defect in continuous operation, for low reaction rates mean low throughput rates.

Still another alternative has been the use of aqueous solutions of water-soluble cobalt salts, such as cobalt acetate. Here also the reaction rates of the aqueous solution are considerably slower than those of oil-soluble cobalt salts. Furthermore, in order to add an amount of cobalt acetate equivalent to cobalt oleate to provide the desired cobalt concentration of about 0.3 weight percent, about 5–6 volume percent of water (based on olefin) must be added to the olefin feed. Such a system has been found not to function efficiently, and to give a more unfavorable feed rate vs. olefin conversion relationship than cobalt oleate catalyst at equivalent cobalt concentration. This is illustrated in the following example, where a heptene fraction from a propylene-butylene polymerization unit was continuously carbonylated with 0.3 weight percent of cobalt catalyst at 340–350° F.

| Catalyst System | Liquid Feed Rate, v. v. hr. | Conversion, Mol Percent |
|---|---|---|
| Cobalt Oleate in Olefin | 0.6 | 80 |
| Do | 1.2 | 74 |
| Cobalt Acetate in Water | 0.6 | 72 |
| Do | 1.2 | 54 |

Thus with the aqueous cobalt acetate catalyst it is necessary to decrease olefin feed rate by almost 50% to achieve a conversion level equivalent to cobalt oleate.

The relative reaction rates of a number of types of cobalt-containing substances at a temperature of 340–350° F. are listed below:

| Catalyst | Induction Period, Min. | Reaction Rate, $k \times 10^2$ |
| --- | --- | --- |
| Cobalt oleate | 30 | 7.8 |
| Cobalt acetate solution (4% water in olefin) | 20 | 1.4 |
| Cobalt Carbonate, Solid | 5 | 0.5 |
| Cobalt Oxalate, Solid | 5 | 0.5 |
| Cobalt Formate, Basic, Solid | 5 | 0.5 |
| Cobalt Sulfate $\cdot 7H_2O$ | <5 | 0.7 |
| Cobalt Oxide | 4–5 | 0.5 |
| Cobalt Metal | 4–7 | 0.5 |

These figures show the great diversity in reaction rates characterizing various cobalt catalyst systems. The low reaction rates of the cobalt salts such as oxalate, carbonates, etc., and of the oxide and metal are a direct result of the low rate of conversion of these solids to active catalyst, i. e. cobalt hydrocarbonyl.

It is an object of the present invention to set forth a process for preparing aldehydes and alcohols from olefins employing a catalyst system that provides a reaction rate of substantially the same order of magnitude as that of oil soluble catalysts, but which is substantially cheaper and is not associated with the disadvantages resulting from use of such soluble catalysts.

It is a still further object of the present invention to employ cheap and readily available cobalt oxide in the Oxo reaction and to realize reaction rates substantially equivalent to those associated with cobalt oleate.

It has now been found that cheap but unreactive forms of cobalt, and in particular, cobalt oxide, may be employed in the Oxo reaction and high reaction rates realized, when employed in conjunction with small amounts of co-catalysts of an acidic nature.

The co-catalyst may be added in any convenient manner, either with the Oxo catalyst as a slurry, or separately as, for example, in the olefin feed or recycle stream. In a preferred embodiment, cobalt oxide is employed as a slurry, and glacial acetic acid as the co-catalyst. The slurry may be injected into the Oxo reactor by any conventional method of adding a slurry to a system under pressure. Such methods include slurry pumps, injectors, surge systems, etc. One embodiment of a system suitable for carrying out the present invention is shown diagrammatically in Figure 1.

Turning now to Figure 1, solid cobalt oxide of suitable particle size is introduced into mixing chamber 2 through hopper 4.

Olefin feed or Oxo product is added to the mixing chamber through line 3 such that the slurry contains from 2 to 10% solids. Likewise, glacial acetic acid is added. The acetic acid is added to the extent 1–6 mols of acid per mol of cobalt oxide, preferably 3–4.5 mols acid per mol of oxide. By means of the circulation pump 6, the slurry is circulated through lines 8, 10 and 15 to both the top and bottom of the mixing chamber. By means of a suitable surge pump liquid olefin or Oxo product is introduced through lines 14 and 16 into surge vessel 18. The system is so designed that except under positive action from the surge pump, the pressure in the surge vessel is sufficiently low to allow slurry to pass through the lower check valves 12. Under positive action from the surge pump, the slurry is forced through the upper check valves 20.

The slurry of cobalt oxide dispersed in the acetic acid and olefin feed or other organic medium, such as recycle aldehyde product or even alcohol distillation bottoms, is thus continuously injected into carbonylation reactor 24 through line 22. The slurry which consists of about 0.1 to 3% by weight of cobalt oxide calculated as cobalt, may be injected at the rate of about 5 to 200 pounds per barrel of olefin, at pressures preferably equal to or slightly higher than those prevailing in reactor 24.

A gas mixture comprising $H_2$ and CO in approximately equal volumes, though 0.5–2 volumes $H_2$/CO may be used, is supplied through line 26 and flows concurrently with preheated liquid olefin feed admitted through line 28, and with the catalyst slurry. Reactor 24 is preferably operated at pressures of about 2500–3500 p. s. i. g. and temperatures of 300–375° F., depending upon the olefin feed and other reaction conditions. Liquid feed rates of 0.2 to 2.0 v./v./hour may be employed.

Liquid oxygenated reaction products consisting mainly of aldehydes, containing cobalt carbonyl in solution, as well as unreacted synthesis gases, are withdrawn overhead through line 30 from high pressure reactor 24 and thereafter freed from dissolved and suspended cobalt. Thus, the cobalt contaminated aldehyde product may be freed of dissolved cobalt by heating it in the presence of water or dilute acid, in particular dilute acetic acid, and thereafter hydrogenated to the corresponding alcohol. If desired, it may be highly advantageous to filter the Oxo reactor effluent prior to or subsequent to decobalting, or both.

The process of the present invention may be further illustrated by the following specific examples:

Example 1

The experimental procedure consisted in charging the olefin and solid catalyst to a bomb at room temperature, bringing the bomb up to 100 p. s. i. g. with 1/1 synthesis gas and heating to the desired reaction temperature, quickly increasing the synthesis gas pressure to 3000 p. s. i. g., withdrawing samples of the product as reaction proceeded (400–500 p. s. i. g. drop) and stopping the run when final pressure had decreased to 1000 p. s. i. g. The final olefin conversion was of the order of 45–55% in all cases. The product samples were inspected for soluble cobalt content and olefin conversion, and the latter values used to calculate the average reaction velocity constant "$k$."

| Feed | $C_7$ Olefins | | | | | $C_{12}$ Olefins | | |
| --- | --- | --- | --- | --- | --- | --- | --- | --- |
| Catalyst | Cobalt Oleate | Cobalt Oxide | Plus Acetic Acid | Cobaltous Oxide | Plus Acetic Acid | Cobalt Oleate | Cobalt Oxide | Plus Acetic Acid |
| Temperature, ° F | 358 | 356 | 361 | 358 | 375 | 351 | 347 | 365 |
| Pressure at Start, p. s. i. g | 3,000 | 3,000 | 3,000 | 3,000 | 3,000 | 3,000 | 3,000 | 3,000 |
| Pressure at End, p. s. i. g | 1,000 | 1,000 | 1,000 | 1,000 | 1,000 | 1,000 | 3,000 | 1,000 |
| Percent Olefin Conversion | 47.5 | 48.5 | 47 | 48 | 43 | 52 | (*) | 49.5 |
| Reaction Constant, $K \times 10^2$ | 9.0 | 0.5 | 6.9 | 0.7 | 6.7 | 6.0 | (*) | 1.3 |
| Relative Catalyst Activity to Cobalt Oleate | 1 | 0.05 | 0.76 | 0.08 | 0.75 | 1 | | 0.22 |
| Inspection of Products: | | | | | | | | |
| Percent Soluble Cobalt | 0.13 | 0.001 | 0.005 | 0.007 | 0.002 | 0.12 | 0.000 | 0.01 |
| CO No | | 183 | 173 | 183 | 153 | 58 | | 65 |
| OH No | | 26 | 48 | 32 | 52 | 116 | | 100 |
| Saponification No | | 9 | 7 | 21 | 17 | 22 | | 12 |
| Acid No | | 0.3 | 1 | 3 | 3.4 | 4.2 | | 2.1 |

*No reaction after 5 hours.

These results show clearly that while cobaltic and cobaltous oxide show low activity of $\frac{1}{15}$–$\frac{1}{7}$ that of cobalt oleate catalyst, the addition of 0.1% by weight on feed of acetic acid to the oxides results in a 10 fold increase in catalyst activity and shorter induction period. A similar order of catalyst activity is noted in both the oxonation of a $C_7$ and the more difficultly oxonatable $C_{12}$ olefin.

Figure 2:
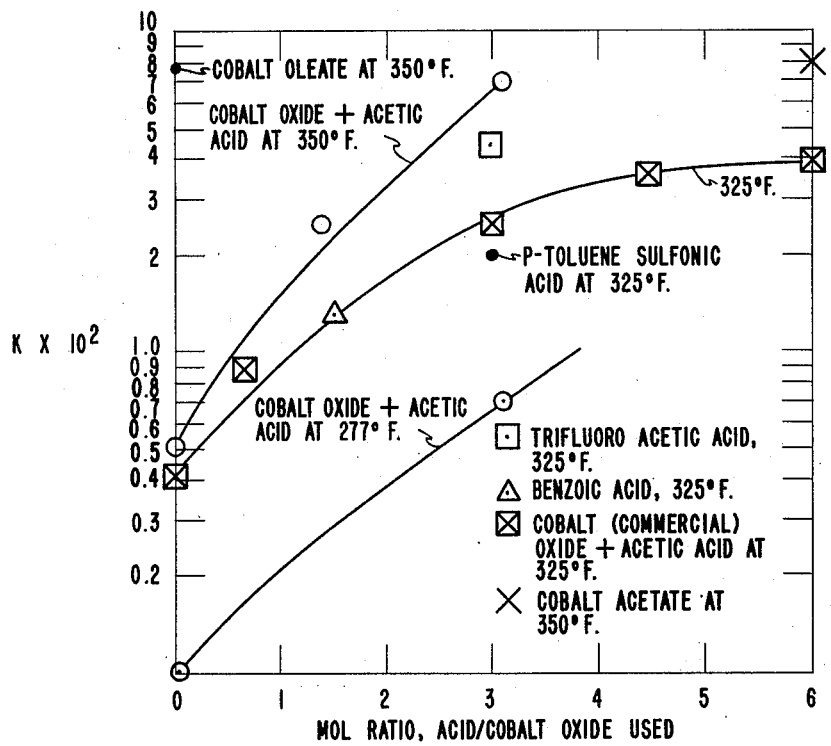

The effect of acid addition to cobalt oxide catalyst is clearly seen in Figure 2, wherein the reaction velocity constant associated with the addition of various acids, and various mol ratios, is clearly evident. These data show that organic acids in general have some effect; the most notable being shown by acetic acid. Formic acid, on the other hand, actually was found to inhibit the reaction. This is consonant with the general finding that the first members of homologous series have characteristics different from those of higher members.

It is also noted that the highest rate increase effect is attained, in the case of acetic acid, at about 3–4 mols of acid per mol cobalt oxide used. The commercial cobalt oxide employed in these experiments analyzed about 25% CoO and 75% of the double compound $CoO \cdot Co_2O_3$. This material is substantially completely insoluble in glacial acetic acid and even with $H_2SO_4$ is digested with a great deal of difficulty. On a stoichiometric basis, 6 mols of acetic acid would be associated with one mol of the commercial oxide calculated as cobalt acetate. The results, however, show that maximum increases in rates are obtained at an acid/oxide ratio less than this stoichiometric quantity. These considerations would indicate that cobalt acetate is probably not formed in the course of the reaction or, if formed, it is present in an activated state.

To determine whether it is the extent of acidity or degree of ionization that is responsible for the increase in reaction rate, further experiments were carried out at 325° F. and 3000 p. s. i. g. employing 85% phosphoric acid. No enhancement in activity of the cobalt oxide was observed even after 3 hours. Formic acid also, as has been pointed out, gave no enhancement. This acid also is 10 times stronger than acetic acid. Toluene sulfonic acid, which is also stronger than acetic acid, gave some increase, but not to the extent found with acetic acid.

Figure 3:
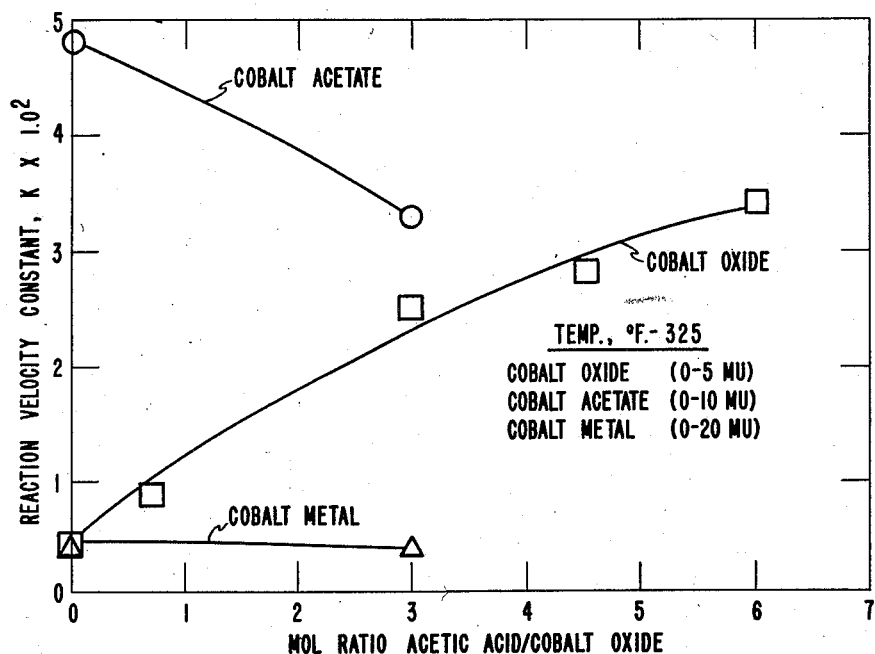

Not all forms of cobalt may be activated in the manner described, but apparently only oil- and water-insoluble forms, such as the cobalt oxides. Thus Figure 3 clearly shows that cobalt metal is unresponsive to the acid treatment, while solid cobalt acetate actually decreased in reaction velocity.

The process of the present invention may be modified in many ways without departing from its spirit. Thus instead of adding the catalyst as a continuous stream, it may be desirable to maintain a fixed bed of Oxo catalyst of low order of catalytic activity in a reactor. The reaction is then initiated and controlled by injecting the co-catalyst into the feed or recycle stream. The speed of the reaction is controlled by varying the amount of co-catalyst injected.

An important advantage of the process of the present invention is the cobalt catalyst savings that may be realized, because of increased utilization of active catalyst. Thus it has been found that by the technique of the present invention, substantially less catalyst need be employed than when the cobalt oleate or even solid cobalt acetate is employed as the catalyst. This is demonstrated in the table below, where the soluble cobalt concentration at equivalent $C_7$ olefin conversion levels was determined for a series of catalyst systems. Initially, 0.2% by weight of cobalt on olefin, calculated as metal, was added to the reactor.

These data clearly show that at equivalent olefin conversions, substantially less cobalt oxide has gone into solution than cobalt oleate or acetate. Since the acid activated cobalt oxide reaches this conversion level at almost the same rate as the cobalt oleate, it is thus evident that the substantial savings in catalyst costs may be realized.

| Catalyst | Soluble Cobalt Concentration (Average) at 40–50% Olefin Conversion | |
|---|---|---|
| | 350° F. | 325–330° F. |
| Cobalt Oleate | 0.142 | 0.032 |
| Cobalt Acetate · $4H_2O$ | 0.024 | 0.007 |
| Cobalt Oxide + 3 Mols Acetic Acid | 0.002 | 0.008 |
| Cobalt Oxide + 4½ Mols Acetic Acid | | 0.025 |
| Cobalt Oxide + 6 Mols Acetic Acid | | 0.006 |
| Cobalt Oxide | 0.003 | |

The excess cobalt oxide may be recovered, if desired, in any convenient manner. It may be centrifuged from the aldehyde product, filtered, or advantage may be taken of its magnetic properties by electromagnetic recovery. The separated solid catalyst may be washed free of product and returned to the oxonation stage. The soluble catalyst, on the other hand, is separated from the aldehyde product by thermal treatment in the presence of dilute acids, water or inert gases all in a manner known per se.

What is claimed is:

1. In the process wherein olefinic compounds are reacted with $H_2$, CO and a cobalt catalyst at elevated temperatures and pressures in a reaction zone to produce an aldehyde product, the improvement which comprises employing as a catalyst in said process an oxide of cobalt promoted with an organic acid having at least two carbon atoms, said organic acid being present in an amount sufficient to substantially increase the reaction rate.

2. The process of claim 1 wherein said acid is glacial acetic acid.

3. The process of claim 1 wherein said acid is added to the extent of 1 to 6 mols per mol of the oxide of cobalt.

4. The process of claim 1 wherein said oxide is passed to said zone slurried in olefin feed.

5. The process of claim 4 wherein said acid is added to said olefin feed.

6. An improved olefin carbonylation process which comprises passing into an olefin carbonylation zone an olefin, CO, $H_2$, 0.1–3.0% by weight of an oxide of cobalt, and 1–6 mols of glacial acetic acid per mol of oxide, maintaining temperatures of 150–450° F. and pressures of 1500–4500 p. s. i. g. in said zone, and withdrawing an aldehyde product from said zone.

7. The process of claim 6 wherein said oxide is added as a continuous stream into said zone as a slurry in an organic liquid.

8. The process of claim 7 wherein said liquid is olefin feed.

9. The process of claim 8 wherein said acid is added concomitantly with said oxide.

10. The process of claim 9 wherein 3–4.5 mols of acid per mol of oxide is added to said zone.

11. The process of claim 6 wherein said oxide is maintained as a fixed bed in said carbonylation zone and said carbonylate reaction is controlled responsive to the injection of said acid to said zone.

References Cited in the file of this patent

UNITED STATES PATENTS

| 2,402,133 | Gresham et al. | June 18, 1946 |
| 2,564,130 | Schreyer | Aug. 14, 1951 |

OTHER REFERENCES

I. G. Farbenindustrie patent appl. I 70739 IV d/120 (OZ. 13,059), T. O. M. Reel 36, Item 21. Deposited in Library of Congress, Apr. 18, 1946, available as Meyer Translation PC-S-V (pgs. 28–30).